Figure 1:
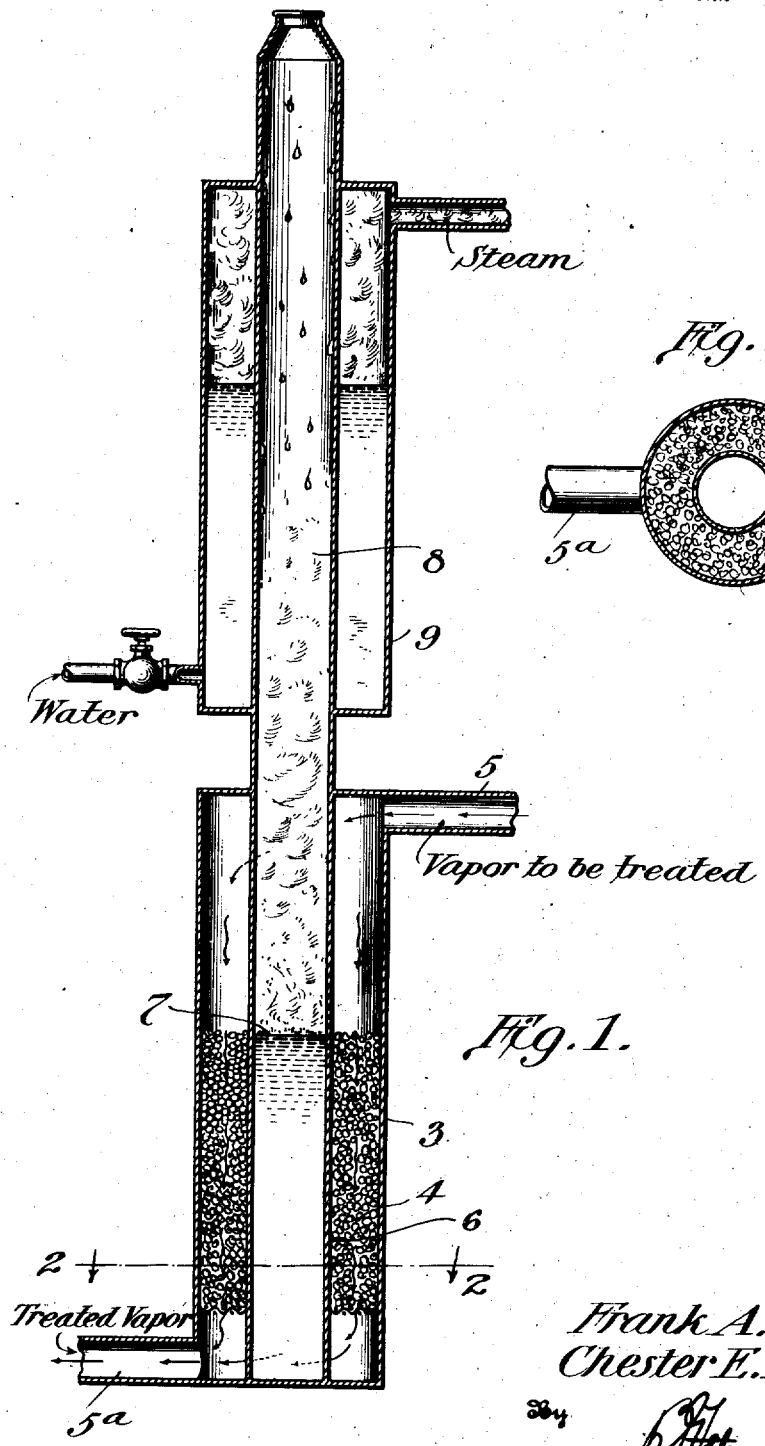

Dec. 20, 1927.

F. A. CANON ET AL

Re. 16,824

PROCESS OF CARRYING ON CATALYTIC REACTIONS

Original Filed June 20, 1922

Inventor,
Frank A. Canon &
Chester E. Andrews.
By
Attorney

Reissued Dec. 20, 1927. Re. 16,824

UNITED STATES PATENT OFFICE.

FRANK A. CANON AND CHESTER E. ANDREWS, OF PITTSBURGH, PENNSYLVANIA, ASSIGNORS TO THE SELDEN COMPANY, OF PITTSBURGH, PENNSYLVANIA, A CORPORATION OF DELAWARE.

PROCESS OF CARRYING ON CATALYTIC REACTIONS.

Original No. 1,614,185, dated January 11, 1927, Serial No. 569,735, filed June 20, 1922. Application for reissue filed April 22, 1927. Serial No. 185,902.

In the art of exothermic chemical reactions very practical difficulties have been experienced in dissipating the excessive heat thereby generated.

The catalytic air oxidation of anthracene to anthraquinone is an example of such a reaction. In that process the optimum temperature is above 450° C., lying roughly between 450° C. and 550° C., but much higher temperatures will automatically build up unless prevented. Another example is the air oxidation of naphthalene to phthalic anhydride. In the latter process the optimum temperature is above 400° C., lying roughly between 400° C. and 450° C., but much higher temperatures will also be reached unless prevented.

It is the object of the present invention to provide an improved process for carrying out exothermic chemical reactions of this character which will permit the zone of reaction to reach and maintain a desired operating temperature, but will prevent its rise to an abnormal degree thereabove, the process being substantially automatic in operation.

In processes of the above character in which the lower operating temperatures obtain, water has been employed as a cooling agent, and in some respects has ideal characteristics. It is easily obtained, has great thermal capacity and can be conveniently directed and controlled. If properly brought into heat transferring relationship to the catalyst and the reaction vapors, it will be caused to boil. This will result in the absorption of great quantities of heat from the catalyst and the reacting gases because of the large amount of heat (latent heat of vaporization) required to effect its boiling operation.

The use of mercury has been proposed but this material presents serious difficulties. In the first place its boiling point is too low for successful application without special though well-known methods of treatment which add materially to the cost of operation. Its high cost makes unlimited use, like that of water, prohibitive. In addition it has a relatively low degree of heat absorption and a relatively low rate of heat conductivity. It is also subject to oxidation and its high specific gravity necessitates special and costly means for supporting and containing it.

In carrying out the present invention we have discovered that if a composite metal, consisting of one or more metals that will boil below the desired temperture of the reaction and one or more metals that will boil above the said desired temperature of the reaction, is formed in proper proportions, and this composite metal is placed in heat-transferring relation to the catalyst and the reacting gases, it will be caused to boil at a temperature close to but slightly below the desired temperature of the reaction and may be thus made to control the temperature of the reaction and keep the same well within maximum limits while permitting it to reach and maintain an efficient minimum. It will be apparent that the method of the present invention can be used to control the temperature of exothermic reactions which are to be carried out at a temperature falling within the boiling point range of the composite metal alloys. In addition this composite metal will have a low melting point, great thermal capacity and conductivity and relatively light specific gravity.

Taking the air oxidation process of converting naphthalene to phthalic anhydride as an example of the practical application of the invention, a heated mixture of air or other oxygen containing gas and naphthalene in the vapor phase and at a suitable temperature is brought into the presence of a suitable catalyst—for instance, vanadium oxide. The nahpthalene is thereby converted into phthalic anhydride and a large amount of heat is thereby generated, resulting in high temperatures unless controlled. The reaction temperature as above stated should run between 400° and 450° C. and the desired temperature for the most effective working of this conversion process is ordinarily at approximately 425° C. Obviously temperatures materially above the same are not only undesirable but experience has demonstrated that very high temperature is detrimental to the product and apt to be disastrous to the reaction apparatus.

If cadmium which boils at 778° C., and mercury which has a boiling point at 357° C. be mixed in certain proportions a composition can be obtained having a boiling point which is close to that of the desired reaction temperature. Thus a composition made up of 12%, by weight, of cadmium and 88% by weight of mercury, is semi-liquid at 20° C. and has a boiling point of approximately 370° C., whereas 40% by weight, of cadmium combined with 60% by weight, of mercury is liquid at about 151° C. and boils at approximately 430° C. If a working reaction temperature of approximately 425° C. is taken as satisfactory, a boiling temperature of about 400° C. for the controlling composition is substantially satisfactory, and this can be obtained by a mixture of 25%, by weight of cadmium and 75% by weight of mercury. This particular mixture is liquid at about 100° C. The composition has other valuable features besides that of its boiling point. While the thermal conductivity of mercury is relatively low (.0189) that of cadmium is .215, so that the thermal conductivity of the composition is high, which is an important factor that assists it in its heat-dissipating qualities. Moreover the specific gravity of the composition is less than that of mercury, the latter being 13.5 while cadmium is 8.6.

In practicing the process the composite metal is brought into heat transferring relation to the zone of reaction by any suitable or obvious means, being held in a suitable container through the walls of which the heat of reaction will pass to the metal, causing the latter to boil and thereby absorb such heat. The vapors thus generated may be collected, condensed and returned to heat transferring relationship to the zone of reaction for reuse, the low melting point of the metal making this easy of accomplishment.

Figure 2:
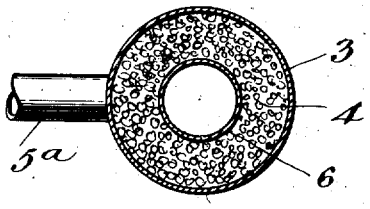

Thus in the accompanying drawings:

Figure 1 is a vertical sectional view diagrammatic in character of a type of apparatus for carrying out the process, Figure 2 is a cross sectional view of the same.

A chamber 3 containing a catalyst 4 is provided with an inlet 5, through which the preheated gases as above described are introduced, and an outlet 5a from which the treated gases pass for further treatment. Inside this chamber is a container 6 in which the composite metal 7 is placed. The vapors from the boiling metal 7 rise to a condenser 8 which may be jacketed as shown at 9 to hold a cooling medium of lower boiling point, as for example, water. The water may be made to boil in performing its condensing operation and the steam thus generated or the heat absorbed employed in turn for any useful purposes desired. The composition, however, having a low melting point, will maintain a fluid condition and consequently gravitate back to heat transferring relationship to the zone of reaction. The same process may be successfully carried out in the catalytic oxidation of anthracene to anthraquinone. In that process anthracene in the vapor phase and mixed with air or other oxygen containing gas in properly heated condition is brought into the pressure of a catalyst, for instance molybdenum oxide. The optimum temperature lies between 450° C. and 550° C. If, therefore, approximately 515° C. is taken as a desired working temperature, a composition of 60% by weight of cadmium and 40% by weight of mercury will give a boiling point of about 492° C.

This process can thus be successfully carried out with the apparatus of the type as that above suggested for the production of phthalic anhydride and is of decided importance for the purpose of producing anthraquinone, since so far as we are aware no satisfactory catalytic oxidation process of this character has been commercially practicable because of the difficulties of controlling the high temperatures necessary to the satisfactory working of the process with the materials used as controlling substances up to this time.

What we claim, is:

1. The process of carrying on exothermic chemical reactions at temperatures within the range of boiling points of alloys containing cadmium and mercury, which comprises transmitting excess heat exothermically generated to an alloy consisting substantially entirely of cadmium and mercury which will boil at the temperature desired, and boiling said alloy by means of said excess heat.

2. The process of carrying on catalytic reactions, which consists in carrying on an exothermic vapor phase catalytic reaction at a temperature falling within the range of boiling points of cadmium and mercury alloys, and maintaining such temperature by transmitting the excess heat exothermically generated to a composition consisting substantially entirely of cadmium and mercury which will boil when said temperature is reached and boiling said composition by said excess heat.

3. The process of carrying on catalytic reactions, which consists in carrying on an exothermic vapor phase catalytic reaction at a temperature between 370° C. and 450° C., and maintaining such temperature by transmitting the excess heat exothermically generated to a composition consisting substantially entirely of cadmium and mercury that will boil when said temperature is reached and boiling said composition by said excess heat.

4. The process of carrying on catalytic reactions which consists in carrying on an exothermic reaction of a heated gas in the presence of a heated catalyst at a temperature ranging approximately between 400° C. and 550° C. and maintaining such temperature by transmitting the excess heat exothermically generated to a composition of cadmium and mercury that will boil when said temperature is reached, and boiling said composition by said excess heat.

5. The process of converting anthracene to anthraquinone which consists in subjecting a mixture of anthracene vapor and an oxygen containing gas to a catalyst at a working temperature ranging approximately between 450° C. and 550° C. and maintaining said temperature by transmitting the excess heat generated to a composition of cadmium and mercury that will boil at said temperature.

FRANK A. CANON.
CHESTER E. ANDREWS.